United States Patent
Cummins et al.

(10) Patent No.: US 6,644,449 B1
(45) Date of Patent: Nov. 11, 2003

(54) FLAT WIRE CABLE COIL FOR COUPLING TO A ROTATING ELEMENT

(75) Inventors: Robert P. Cummins, Deephaven, MN (US); Todd A. Britz, Lakeville, MN (US)

(73) Assignee: Primera Technology, Inc., Plymouth, MN (US)

(*) Notice: Subject to any disclaimer, the term of this patent is extended or adjusted under 35 U.S.C. 154(b) by 112 days.

(21) Appl. No.: 09/874,829

(22) Filed: Jun. 5, 2001

Related U.S. Application Data

(60) Provisional application No. 60/210,555, filed on Jun. 9, 2000.

(51) Int. Cl.$^7$ .................................................. H02G 11/02
(52) U.S. Cl. ............................ 191/12 R; 414/744.2; 414/918
(58) Field of Search ........................... 414/918, 744.1, 414/744.2, 744.3; 191/12 R; 242/388, 388.9; 254/389; 439/15, 457, 492, 493, 67; 174/135

(56) References Cited

U.S. PATENT DOCUMENTS

| | | | |
|---|---|---|---|
| 3,300,572 A | * | 1/1967 | Dahlgren .................. 191/12 R |
| 4,257,028 A | * | 3/1981 | Narozny et al. ............ 439/399 |
| 4,499,341 A | * | 2/1985 | Boyd ........................ 191/12.4 |
| 5,240,092 A | * | 8/1993 | Eachus ...................... 191/12 R |
| 6,141,298 A | | 10/2000 | Miller ......................... 369/30 |

\* cited by examiner

*Primary Examiner*—Eileen D. Lillis
*Assistant Examiner*—Michael Lowe
(74) *Attorney, Agent, or Firm*—Westman, Champlin & Kelly, P.A.

(57) ABSTRACT

A rotating handler arm is mounted on an upright column, and has electrical components thereon, which require powering. The power is carried to the rotating arm by a multi conductor flat cable that is supported on a platform adjacent to the rotating arm in a coil. The cable clamped to the platform as well as to the rotating member. The coil is made of a sufficient number of individual coil sections so that the coil will tighten as the rotating arm rotates in a first direction, and loosen as the rotating arm rotates in a second direction to avoid the need for slip rings or other complex electrical transmission elements.

11 Claims, 3 Drawing Sheets

FLAT WIRE CABLE COIL FOR COUPLING TO A ROTATING ELEMENT

CROSS REFERENCE TO RELATED APPLICATION

This application claims priority on benefit of U.S. Provisional Application No. 60/210,555, filed Jun. 9, 2000 and entitled "FLAT WIRE CABLE COIL FOR COUPLING TO A ROTATING ELEMENT".

BACKGROUND OF THE INVENTION

The present invention relates to mounting a flat wire electrical cable used for carrying power into components on rotatable elements, such as a manipulator swing arm or handler arm without use of slip rings or other expensive connections. The arm shown is for handling compact discs, or other discs that have center holes used for lifting, in a pick and place type operation.

Rotating a laterally extending disc lift arm that is used for handling components about an upright axis in small spaces requires transferring power to operate grippers at the outer end of the arm while the arm is permitted to rotate. Slip rings have been used for transmitting power, but slip rings are expensive, sometimes unreliable and require maintenance and cleaning. Additionally, various coiled cords similar to a telephone hand piece cord have been used, but tangling continues to be a problem. Unrestricted rotational movement without having the coil or the cord move from side to side and get in the way of moving parts is a problem as well.

SUMMARY OF THE INVENTION

The present invention relates to providing a mounting of an electrical cable carrying power between a stationary frame and a rotating member, such as an arm that has a gripper at its outer end. As shown, a multi conductor flat wire cable is formed in a coil about an axis parallel to the axis of rotation of the arm. The arm is mounted on an outer end of a column that extends from a platform or support. Power is required for components, such as a gripper on the arm. The power cable coil is supported on a platform surface and one end of the coil is clamped to the platform. The other end of the coil, which preferably has multiple turns, is guided about the rotating element, as shown, and secured thereto. The coil is loose and as the rotating element rotates, the coil tightens and loosens without tangling or excessive displacement.

Specifically, the coiled cable is used with a compact disc printing apparatus where blank discs are retained in a stack, and are held by a grip on a rotating arm supported on a column, moved to a printing station, deposited in the station, and when printed, the disc is moved from the initial stack to a finished disc stack. The finished disc stack or station is on an opposite side of the print station from the blank disc station, but the finished disc station can be adjacent the blank disc station as well. The apparatus can be used to record and print discs by adding a recording station to the sequence.

Rotation of the arm about the axis of the support column is at times greater than 180°, and with the present invention, a full 360° rotation can be obtained with little additional, if any, space by utilizing the coil of the flat wire cable of the present invention.

A length of flat wire cable extends below the support platform through an opening in the platform. The cable is secured to the support platform, as stated, and passed up through the opening to a generally horizontal upper surface of the support platform. The cable is fixed to the edges of the opening and is folded so the plane of the flat cable above the platform is perpendicular to the platform upper surface and formed into a loose coil. The coil of cable is formed around the opening and the free end portion of the cable is passed under a retaining or guide tab on the platform, and then extends around upright supports of the rotating column or tower which is adjacent to the platform. The cable is secured in place on the upright supports of the column or tower, with the plane of the cable length between the coil and the tower still is positioned perpendicular to the supporting surface of the platform. The free end of the cable then can be run up to the top of the column or tower, where the arm is positioned and connected to carry power to components on the arm.

Other components on the arm can be powered, other than a gripper, utilizing the unique positioning and handling of a take up coil for the electrical power transmission cable.

DETAILED DESCRIPTION OF THE ILLUSTRATIVE EMBODIMENTS

Figure 1:
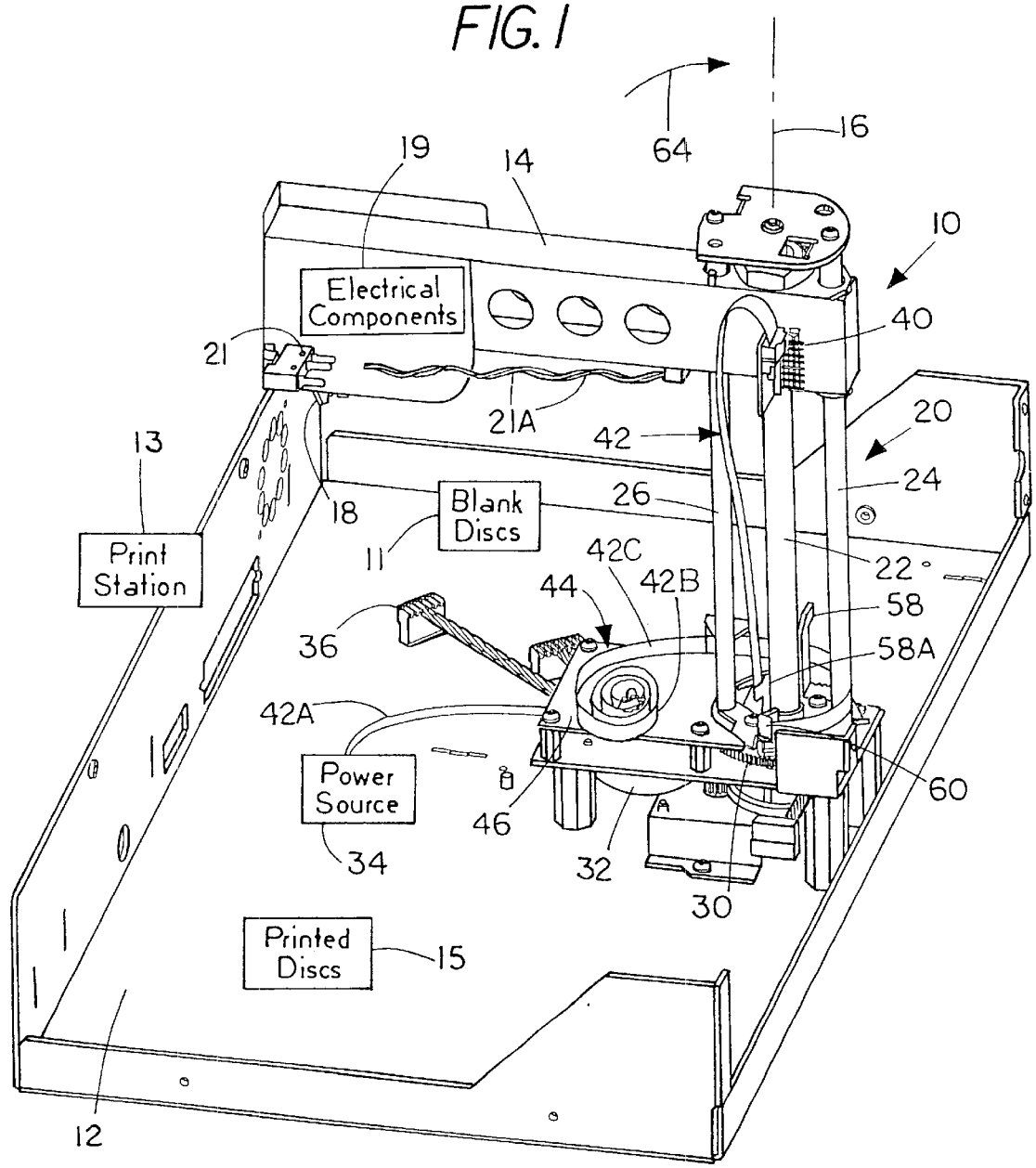
FIG. 1 is a perspective view of a typical handler arm for discs that have openings in the middle, such as CD's and similar configured discs, with which arm and the cable of the present invention is utilized.

A schematically shown flat disc handler arm assembly is illustrated generally at 10. It is mounted in a housing or chassis 12, that can have suitable storage areas or stations for circular discs having holes in the center, such as CD's, DVD's, optical discs and the like. The station includes a blank disc storage station 11, a printer station 13 and a printed disc storage station 15.

The handler comprises a pick and place arm 14, that is rotatably mounted about an upright or vertical axis 16, and has a disc grip, the end portions of which are shown at 18, for engaging the center hole of a disc, such as a CD. The handler arm assembly 10 has movable parts, which include electrical components 19, that are connected with a connector 21 to a lead 21A that goes back to adjacent the center axis of the rotating arm 14.

The arm 14 is supported on a rotating column or tower assembly 20, including a arm height adjustment post 22, and radially spaced supports posts or columns 24 and 26. The posts 24 and 26 are mounted onto a ring gear 30, which can be of any suitable design. A gear train drives the ring gear 30 from a motor shown schematically at 32. The motor 32 can be connected to a power source 34 through connectors shown at 36, without any need for a rotating coupling since the motor is stationary. However, the electrical connection from the housing of chassis 12 to the electrical components 19 on the arm 14 has to be capable of permitting rotation of the tower assembly 20 about the upright axis 16 for at least 270° in order to obtain adequate rotational movement of the arm 14 for operation.

As shown, a connector 40 is mounted on the side of the arm 14, and connects to a multi conductor flat wire cable 42. The connector 40 also in turn connects to the line 21A to carry power to the electrical components 19 at the outer end of the arm 14.

Figure 2:
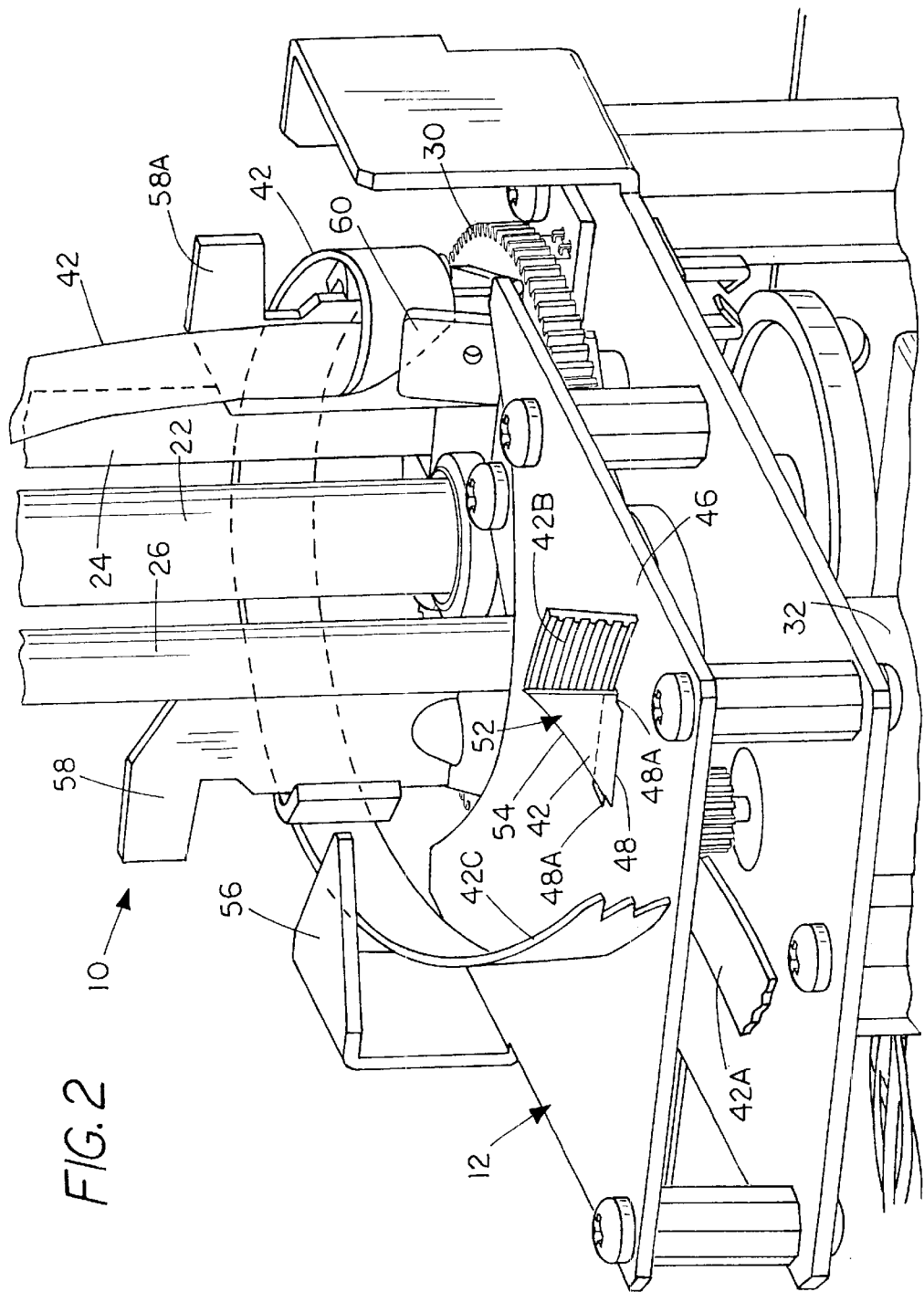
FIG. 2 is an enlarged perspective view of the base support for the rotating handler arm shown in FIG. 1.

In order to keep the flat wire cable 42 in proper orientation, a cable coil 44 of multiple turns is provided on the top of a support platform 46 on the housing. The end of the platform 46 has a recess that is adjacent the rotating tower or column 20. The platform 46 is stationary relative to the rotating column 20. As shown in FIG. 2, the flat wire cable 42 has a length or portion 42A under the platform 46 that leads from the power source 34 to an opening 48 in the platform 46.

Figure 3:
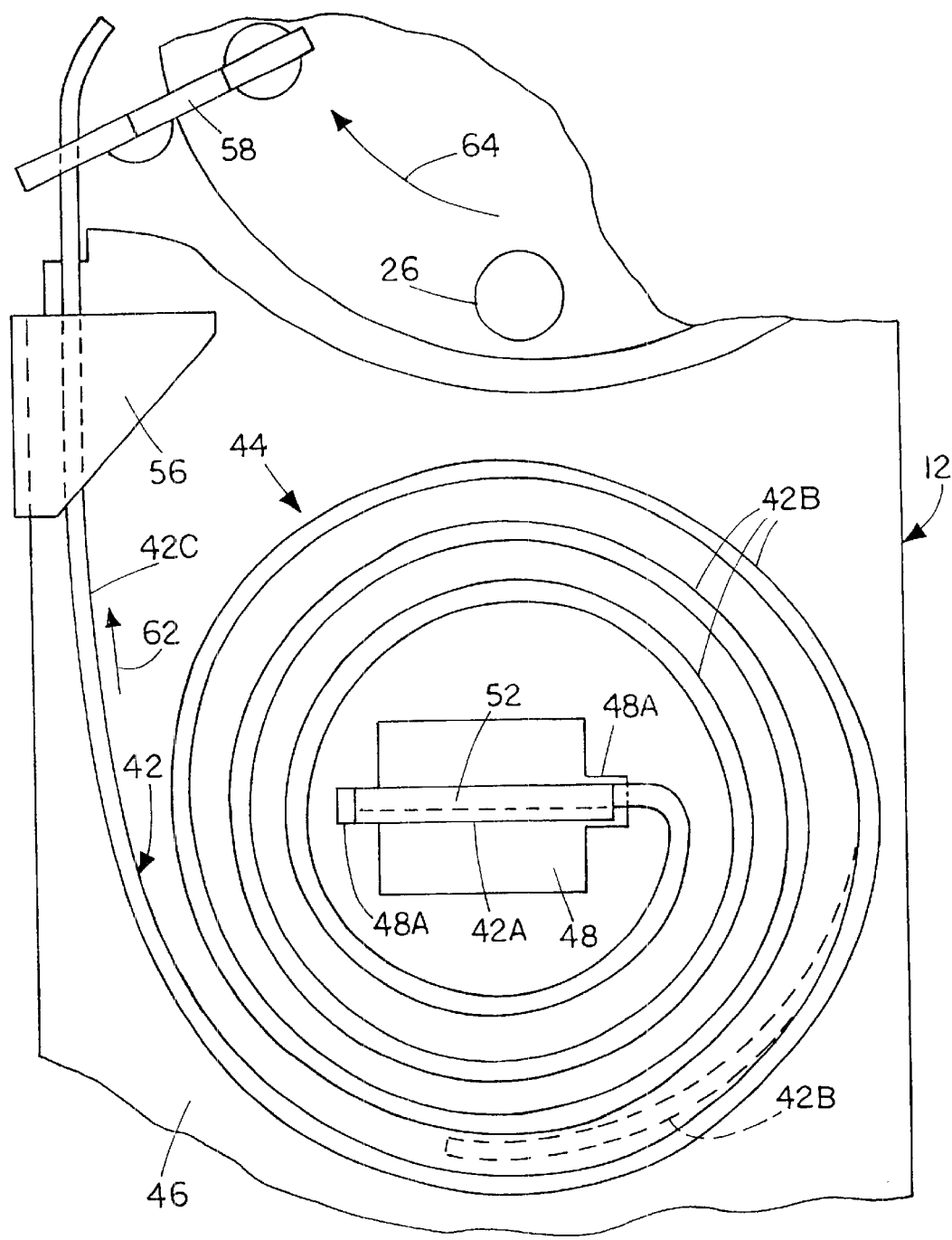
FIG. 3 is a schematic plan view of a coiled flat wire cable secured to the support platform shown in FIGS. 1 and 2.

The opening 48 is of size to permit the cable 42 to pass up through the opening. The cable is folded so the plane of the cable length forming the coil 44 is 90° to the plane of the length extending up through opening 48. The plane of the cable transitions 90° from where it passes through the opening 48 to a location where the coil 44 rests on the platform 46. This is shown in FIG. 2, as well as in FIG. 3. The opening 48 has slot portions or notches 48A that are of size to receive edge portions of the cable (FIG. 3). The cable has the one length or portion 42A that extends up through the opening 48 with the edges of the cable held in slot portion 48A and the cable is then folded to hold it in place. The cable fold insures that the width dimension or plane of the cable 42 becomes vertical or perpendicular to the platform surface, instead of resting flat along the upper surface of the platform 46, as shown in FIG. 2. The fold is shown at 52 and is along a diagonal fold line on the cable. The cable section 42A also is folded or twisted below the platform 46 so the cable cannot be pulled farther in either direction through the opening 48 and slot portions 48A. In FIG. 2, the cable portion 42B that forms the coil 44 is behind the section of the cable 42A that extends up through the slot portions 48A of the opening 48. The diagonal fold line or edge is indicated at 54.

The coil 44 is formed into a desired number of loose spirals or individual turns from cable portion 42B, and the spirals are formed outwardly around the opening 48. The free end of the cable 42 has a cable section 42C that extends along a side edge of the platform 46, as shown. The cable section 42C passes under a horizontal guide wall 56 of an L-shaped bracket that is supported on the platform 46, to keep the coil 44 resting on or close to resting on the top surface of the platform 46. Again, the axis of the coil 44 is parallel to the pivot axis 16 of the arm 14. The cable then passes around upright guides 58 and 58A on the rotating tower of column 20, and around at least one of the uprights 24 and 26. Depending on the position of the arm 14, the cable may engage or contact only guide 58A and not guide 58. These guides or components keep the cable initially looped in a large diameter loop a position spaced adequate from the center post 22 so the cable does not bend excessively as it winds and unwinds. The guides 58 and 58A rotate with the column 20.

The cable 42 is then coupled to move with the guide 58A on the rotating column 20 as shown with a clamp or other security member 60. It can be fastened with adhesives or the like, as well The cable extends up along the tower or column and the free end of the cable 42 joins the connector 40.

The coil 44 is made loose enough so that the column 20 can rotate a full 360° without causing the coil to over-tighten such an extent as to cause damage by tension in the cable. As shown in dotted lines by the outer coil in FIG. 3, the loose coils will move together as the outer cable portion 42C is pulled in the direction as indicated by the arrow 62.

When the arm 14 is rotated in a clockwise direction, as indicated by the arrow 64 in FIG. 3, the coil 44 will tighten, and when the arm 14 is rotated in an opposite direction the coil 44 will loosen. The arm 14 is shown in a position quite close to its centered rotational position.

The coil 44 rests on the top surface of the platform 46, and it is held from raising up substantially with the wall 56, and additional guides or walls to keep the coil flat can be utilized as well. The guides 58 and 58A and uprights 24 and 26 keep the cable in place in a loop as the cable wraps around and unwraps from the tower or column 20.

The flat wire cable 42 then can move or slide along the platform surface as the coil 44 tightens and loosens, and the arm 14 is permitted to rotate without requiring slip rings or complex junctions for carrying electrical power from the stationary platform 46 to the rotating column 20 and the rotating arm 14. The cable 42 is sufficiently stiff so it will expand the coils as it moves in the unwind direction. Preferably at least three complete coil sections are provided. A complete coil section extends 360° from the inner start point at opening 48. Preferably between 3 and 6 coils are used.

The drive for the column or tower can be of any desired form, and as shown the support 28 is mounted onto a ring gear 30 that is in turn driven by a gear train from the motor 32.

The plane of the flat wire cable 42 in the coil 44 is parallel to the axis 16 of arm rotation, so that the axis of the coil 44 is also parallel to axis 16. Thus, the cable wraps easily around the tower or column 20 as it rotates without tangling. The cable portion 42A can be oriented in any desired manner and can be held above the upper surface of the platform 46. The platform 46 supports the coil and as forces tend to pull the coil tighter, or to cause it to loosen, the coil merely slides on the upper surface of the platform and expands and contracts as needed.

The coils are made with sufficient looseness to permit the desired amount of rotation.

Although the present invention has been described with reference to preferred embodiments, workers skilled in the art will recognize that changes may be made in form and detail without departing from the spirit and scope of the invention.

What is claimed is:

1. A cable assembly for carrying electrical power from a source below a stationary platform having an upper surface and a rotating column above the upper surface and rotating about an axis substantially perpendicular to the upper surface, comprising a flexible cable, a first portion of the flexible cable being below the platform and a second portion of the flexible cable extending through an opening in the platform to be above the platform and resting on the upper surface thereof, the second portion of the flexible cable being formed into a cable coil about an axis generally parallel to the axis of rotation of and spaced from the rotating column, the cable coil being formed in a plurality of turns with spaces between at least some cable coil turns, and with a third portion of the flexible cable extending along the upper surface from the cable coil to the rotating column, the third portion being retained on the rotating column adjacent the upper surface, whereby the cable coil tightens and loosens and remains on the platform upper surface when the rotating column rotates.

2. The cable assembly of claim 1, wherein said cable comprises a flat wire cable having a plane, the plane of the cable forming the cable coil being generally perpendicular to the upper surface of the platform.

3. The cable assembly of claim 2 and guide members on the rotating column to maintain the flexible cable at a desired radial position as the rotating column rotates.

4. The cable assembly of claim 2, wherein said coil comprises at least three complete coil sections from the cable, with individual sections of the coils being spaced from each other around the central axis to spiral outwardly from a central axis of the coil.

5. The cable assembly of claim 2, wherein the coil comprises between 3 and 6 coil segments.

6. The cable assembly of claim 1, wherein said rotating column comprises a handler arm for discs.

7. The cable assembly of claim 1 and a guide member on the platform spaced from the cable coil and having a portion overlying the flexible cable for keeping the cable coil from moving away from the platform more than a selected amount.

8. A handler comprising a platform positioned above a supporting surface and having an upper surface, a tower rotatably mounted on the platform above the upper surface for rotation about an axis generally perpendicular to the upper surface, an arm supported on an upper end of the tower, and an electrically operated handler on the arm, a cable assembly for carrying electrical power between a power source below the platform and the arm at an upper end of the tower, the cable assembly including a flexible cable having a first end portion below the platform coupled to a power source, a hole in the platform, the flexible cable passing through the hole and retained on the platform with a length of the flexible cable formed into a loose coil around the hole on the upper surface of the platform and spaced from the tower, the flexible cable having a second portion extending along the upper surface from the coil to the tower and being clamped to the rotating tower, and said coil being formed sufficiently loose so that as the tower rotates in a first rotational direction, the coil will tighten to permit the cable to wrap around the tower and as the tower rotates in an opposite direction, the coil loosens and unwraps from the tower while resting on t upper face.

9. The handler assembly of claim 8, wherein said cable comprises a flat wire cable having a plane, the plane of a cable portion forming the coil being generally perpendicular to the upper surface of the platform.

10. The handler assembly of claims 8, and a guide for holding the flexible cable on the upper surface at a position between the coil and thetower.

11. The handler assembly of claim 8, wherein said tower has guide members thereon to hold the flexible cable in a large diameter loop as it wraps around the base of the tower.

* * * * *

UNITED STATES PATENT AND TRADEMARK OFFICE
CERTIFICATE OF CORRECTION

| | | |
|---|---|---|
| PATENT NO. | : 6,644,449 B1 | Page 1 of 1 |
| DATED | : November 11, 2003 | |
| INVENTOR(S) | : Robert P. Cummins and Todd A. Britz | |

It is certified that error appears in the above-identified patent and that said Letters Patent is hereby corrected as shown below:

<u>Column 6,</u>
Line 11, "t" should be -- the --

Signed and Sealed this

Fifteenth Day of June, 2004

JON W. DUDAS
*Acting Director of the United States Patent and Trademark Office*